United States Patent
Endres et al.

(10) Patent No.: US 12,435,169 B2
(45) Date of Patent: Oct. 7, 2025

(54) METHACRYLATE COPOLYMER AND COMPOSITIONS COMPRISING IT

(71) Applicant: Evonik Operations GmbH, Essen (DE)

(72) Inventors: Thomas Endres, Mainz (DE); Christian Moers, Langen (DE); Fabian-Pascal Schmied, Darmstadt (DE); Jan Hendrik Schattka, Darmstadt (DE); Kathrin Nollenberger, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 267 days.

(21) Appl. No.: 17/999,916

(22) PCT Filed: May 26, 2021

(86) PCT No.: PCT/EP2021/063996
§ 371 (c)(1),
(2) Date: Nov. 25, 2022

(87) PCT Pub. No.: WO2021/239787
PCT Pub. Date: Dec. 2, 2021

(65) Prior Publication Data
US 2023/0203223 A1    Jun. 29, 2023

(30) Foreign Application Priority Data
May 28, 2020   (EP) .................... 20176980

(51) Int. Cl.
| | | |
|---|---|---|
| C08F 220/60 | (2006.01) | |
| A23L 33/10 | (2016.01) | |
| A61K 9/28 | (2006.01) | |
| A61K 31/216 | (2006.01) | |
| A61K 31/522 | (2006.01) | |

(52) U.S. Cl.
CPC ............ *C08F 220/60* (2013.01); *A23L 33/10* (2016.08); *A61K 9/2846* (2013.01); *A61K 31/216* (2013.01); *A61K 31/522* (2013.01)

(58) Field of Classification Search
CPC ..... C08F 220/60; A23L 33/10; A61K 9/2846; A61K 31/216; A61K 31/522
See application file for complete search history.

(56) References Cited

U.S. PATENT DOCUMENTS

| | | |
|---|---|---|
| 4,452,862 A | 6/1984 | Markert et al. |
| 6,391,338 B1 | 5/2002 | Frisbee et al. |
| 2020/0115556 A1* | 4/2020 | Sakamoto ............ G03G 9/0906 |

FOREIGN PATENT DOCUMENTS

| | | | |
|---|---|---|---|
| CN | 1334830 | 2/2002 | |
| JP | 10-72323 | 3/1998 | |
| JP | 2002-533537 A | 10/2002 | |
| JP | 2019-1983 | 1/2019 | |
| WO | 00/39176 | 7/2000 | |
| WO | WO-0039176 A1 * | 7/2000 | ............ A61K 47/32 |
| WO | 2019/096833 | 5/2019 | |

OTHER PUBLICATIONS

Extended European Search Report dated Nov. 17, 2020, in European Application No. 20176980.9, 8 pages.
International Search Report dated Sep. 9, 2021, in PCT/EP2021/063996, 5 pages.
Liang et al., "The effects of acrylamides copolymers on the stability and rheological properties of yellow iron oxide dispersion", Colloids and Surfaces A: Physicochemical and Engineering Aspects, vol. 513, 2017, pp. 136-145.
Written Opinion dated Sep. 9, 2021, in PCT/EP2021/063996, 9 pages.
Chinese Office Action dated Feb. 27, 2024, in Chinese Application No. 202180038686.1, with English translation, 17 pages.

* cited by examiner

*Primary Examiner* — Danah Al-Awadi
*Assistant Examiner* — John W Lippert, III
(74) *Attorney, Agent, or Firm* — Grüneberg and Myers PLLC

(57) ABSTRACT

A novel methacrylic copolymer contains units derived from at least one alkyl methacrylate and methacrylamide. The units derived from methacrylamide are present in at least 34 wt.-%, based on the total weight of the methacrylic copolymer. A method can be used for preparing these novel methacylic copolymers. Pharmaceutical compositions, nutraceutical compositions, coated pharmaceutical or nutraceutical dosage forms, as well as nano- or microparticles can contain the methacrylic copolymer. The methacrylic copolymer can be used as a coating, as a carrier, and as a matrix for an amorphous solid dispersion.

17 Claims, 3 Drawing Sheets

Fig. 2

METHACRYLATE COPOLYMER AND COMPOSITIONS COMPRISING IT

CROSS-REFERENCE TO RELATED APPLICATIONS

This application is the National Stage entry under § 371 of International Application No. PCT/EP2021/063996, filed on May 26, 2021, and which claims the benefit of priority to European Application No. 20176980.9, filed on May 28, 2020. The content of each of these applications is hereby incorporated by reference in its entirety.

BACKGROUND OF THE INVENTION

Field of the Invention

The present invention refers to a novel methacrylic copolymer comprising units derived from at least one alkyl methacrylate and units derived from methacrylamide, wherein the units derived from methacrylamide are present in at least 34 wt.-%, based on the total weight of the copolymer. Furthermore, the present invention refers to a method of preparing these novel methacrylic copolymers. Moreover, the present invention refers to pharmaceutical compositions, nutraceutical compositions, coated pharmaceutical or nutraceutical dosage forms as well as nano- or microparticles comprising the methacrylic copolymer of the present invention. Finally, the present invention refers to the use of the methacrylic copolymer of the present invention as coating, as carrier, and as matrix for an amorphous solid dispersion.

Description of Related Art

In the field of pharmaceutical and nutraceutical compositions as well as nanoparticles, the use of methacrylic copolymers in order to modify drug/nutraceutical release properties as well as to influence the stability of the compositions/particles is commonly known.

For example, such (meth)acrylic copolymers are commercially available under the tradename Eudragit® E from Evonik Industries AG. Their use in pharmaceutical compositions is for example disclosed in U.S. Pat. No. 6,391,338 B1, which describes the improvement in solubility or increase in bioavailability of essentially water-insoluble active ingredients, for example ibuprofen, itraconazole and nifedipine by means of flash-flow or extrusion of the active ingredients and polymers of the EUDRAGIT® E type. During the processing, the active ingredients can be converted to an energetically higher state (solid dispersion) and then released in the form of nanoparticles in a dissolved state.

However, there is still the need to obtain novel methacrylic copolymers, which are suitable for pharmaceutical and nutraceutical compositions, which can provide similar or improved properties to such compositions compared to the already known methacrylic copolymers in the field. In particular, methacrylic copolymers, which can provide stable pharmaceutical compositions, which are easier/better to process and can provide improved dosing characteristics, are desired.

SUMMARY OF THE INVENTION

The inventors of the present invention have surprisingly found that this object can be solved by the novel methacrylic copolymer comprising units derived from at least one alkyl methacrylate and units derived from methacrylamide, wherein the units derived from methacrylamide are present in at least 34 wt.-%, based on the total weight of the copolymer of the present invention.

Not to be bound by any theory, it is believed that the rather high amount of units derived from methacrylamide, in particular units derived from dimethylaminopropyl methacrylamide (DMAPMA), lead to similar or even superior effects in view of the commercially available Eudragit® E PO and Eudragit® E 100 polymers.

A polymer similar to the novel polymers of the present invention comprising units derived from DMAPMA was obtained by Caizhen Liang et al. (Colloids and Surfaces A: Physiochem. Eng. Aspects 513 (2017) 136-145) in a remote field, which was not considered by a skilled person in the field of pharmaceutical and nutraceutical compositions. The publication describes the effects of acrylamide copolymers on the stability and rheological properties of yellow iron oxide dispersion. The polymerization of a dimethylaminopropyl methacrylamide (DMAPMA)-butyl methacrylate (BMA)-methyl methacrylate (MMA) copolymer with a molar ratio of 2:1:1 of monomers in the initial monomer feed is described, corresponding to about 59% by weight of DMAPMA, 24% by weight of BMA and 17% by weight of MMA. Polymerization is carried out in the presence of azobis(isobutyronitrile) AIBN as initiator and 2-{[(butylsulfanyl)carbonothioyl]sulfanyl}propanoic acid (IBCP) as chain transfer agent in tetrahydrofuran as solvent. Table 2 of this document shows that the polymerization conditions lead to monomer conversion rates which are remarkably low for DMAPMA and also quite low for BMA. Not to be bound by any theory, it is assumed that this is mainly due to the use of the chain transfer agent IBCP and the use of the RAFT polymerization technique, which beside its effect on the chain length may also influence the monomer specific radical activity. The mean conversion rates are only about 23% for the DMAPMA, 67% for the BMA and 94% for the MMA. Thus, the proportion of monomer units in the DMAPMA-BMA-MMA copolymers of Caizhen Liang et al. can be calculated to be about 29% by weight of polymerized units of DMAPMA, 36% by weight of polymerized units of BMA and 35% by weight of polymerized units of MMA.

Therefore, in a first aspect, the present invention refers to a methacrylic copolymer comprising units derived from at least one alkyl methacrylate and units derived from methacrylamide, wherein the units derived from methacrylamide are present in at least 34 wt.-%, based on the total weight of the copolymer.

In a second aspect, the present invention refers to a method of preparing the methacrylic copolymer of the present invention comprising the steps:
radically polymerizing a monomer mixture comprising or consisting of
40 to 60 wt.-% of a methacrylamide, alkyl methacrylamide or aminoalkyl methacrylamide, and
40 to 60 wt.-% of at least one alkyl methacrylate
wherein the sum of the monomers is 100 wt.-%, in the presence of at least one initiator;
at least one chain-transfer agent; and
optionally in the presence of at least one solvent.

In a third aspect, the present invention refers to a pharmaceutical composition, comprising at least one methacrylic copolymer according to the present invention and at least one pharmaceutically active ingredient.

In a fourth aspect, the present invention pertains to a nutraceutical composition, comprising at least one methacrylic copolymer according to the present invention and at least one nutraceutically active ingredient.

In a fifth aspect, the present invention refers to a coated pharmaceutical or nutraceutical dosage form, wherein the coating comprises at least one methacrylic copolymer according the present invention.

In a sixth aspect, the present invention pertains to a nano- or microparticle comprising at least one methacrylic copolymer according to the present invention.

Finally, in a seventh aspect, the present invention refers to the use of the at least one methacrylic copolymer according to the present invention as coating; as carrier; or as matrix for an amorphous solid dispersion.

These and other aspects, embodiments, features, and advantages of the invention will become apparent to a person skilled in the art through the study of the following detailed description. Any feature from one aspect of the invention can be used in any other aspect of the invention. Furthermore, it will readily be understood that the examples contained herein are intended to describe and illustrate but not to limit the invention and that, in particular, the invention is not limited to these examples.

Numerical ranges that are indicated in the format "from x to y" also include the stated values. If several preferred numerical ranges are indicated in this format, it is self-evident that all ranges that result from the combination of the various endpoints are also included.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one copolymer" means that at least one type of molecule falling within the definition for a copolymer is used but that also two or more different types of copolymers falling within this definition can be present, but does not mean that only one or more molecules of one type of copolymers is present.

All percentages given herein in relation to the compositions or formulations relate to wt.-% relative to the total weight of the respective composition, if not explicitly stated otherwise.

"Essentially free of" according to the present invention with regard to compounds or groups means that the compound or group can only be present in an amount which does not influence the characteristics of the composition, in particular the respective compound or group is present in less than 3 wt.-%, preferably 1 wt.-%, more preferably 0.01 wt.-%, based on the total weight of the composition, or is not present at all.

According to the present invention it is understood by the feature "units derived from" in view of the polymer that the polymer comprises units, which are obtained by polymerizing specific monomers, which are then contained in the polymer as those units. For example, units derived from methacrylamide means that monomers having a methacrylamide group suitable for polymerization are used. The feature includes methacrylamide as such as well as other monomers containing a methacrylamide group like dimethylaminopropyl methacrylamide.

The weight average molecular weight $M_w$ and the number average molecular weight $M_n$ can be determined by GPC or SEC (Gel Permeation Chromatography or Size Exclusion Chromatography) analysis (see, for example, H. F. Mark et al., Encyclopaedia of Polymer Science and Engineering, 2nd Edition, Vol. 10, pages 1 ff., J. Wiley, 1989), preferably employing polymethylmethacrylate standards.

The glass transition temperature $T_g$ may be determined by DSC (Differential Scanning calorimetry) analysis according to DIN EN ISO 11357-2:2013 (measurement without addition of plasticizer at a residual monomer content (ReMo) of less than 100 ppm, heating rate 20° C./min, nitrogen atmosphere).

The Z-Average particle size $D_z$ may be determined by dynamic light scattering (DLS) according to ISO 22412: 2017 (publication date 2017-02) "Particle size analysis—Dynamic light scattering (DLS)". The polydispersity index (PDI) is determined from a two-parameter fit to the correlation data (the cumulants analysis). The calculations used for the determination of PDI are defined in the ISO standard documents 22412:2017.

The amounts of polymerized monomer units in the copolymer and thus the monomer conversion rates are preferably determined by 1H-NMR spectroscopy. The method is well known to a skilled person in the field, for example as disclosed in U.S. Pat. No. 8,399,523 B2, FIG. 2, Table 1, 1H NMR spectroscopy of EUDRAGIT® E PO using deuterated $MeOH_{d4}$.

The amounts of polymerized monomer units may also be indirectly determined via the residual monomer contents (ReMo) in the final copolymer preparation before removement of volatile substances, e.g. before drying (HPLC analysis regarding dimethylaminopropyl methacrylamide as well as GC analysis referring to butyl methacrylate and methyl methacrylate) and subsequent calculation. The method is well known to a skilled person in the field (see for instance WO 2012/048740 A1, p. 20).

Further methods are disclosed in the following description and the example section.

BRIEF DESCRIPTION OF THE DRAWINGS

FIG. 2: Dissolution profiles of ASDs (after 3 months of storage) incorporating fenofibrate and fenofibrate drug substance in 500 ml 0.1N HCl in USP apparatus II. Each value designates the mean±S.D. (n=3).

DETAILED DESCRIPTION OF THE INVENTION

Figure 1:
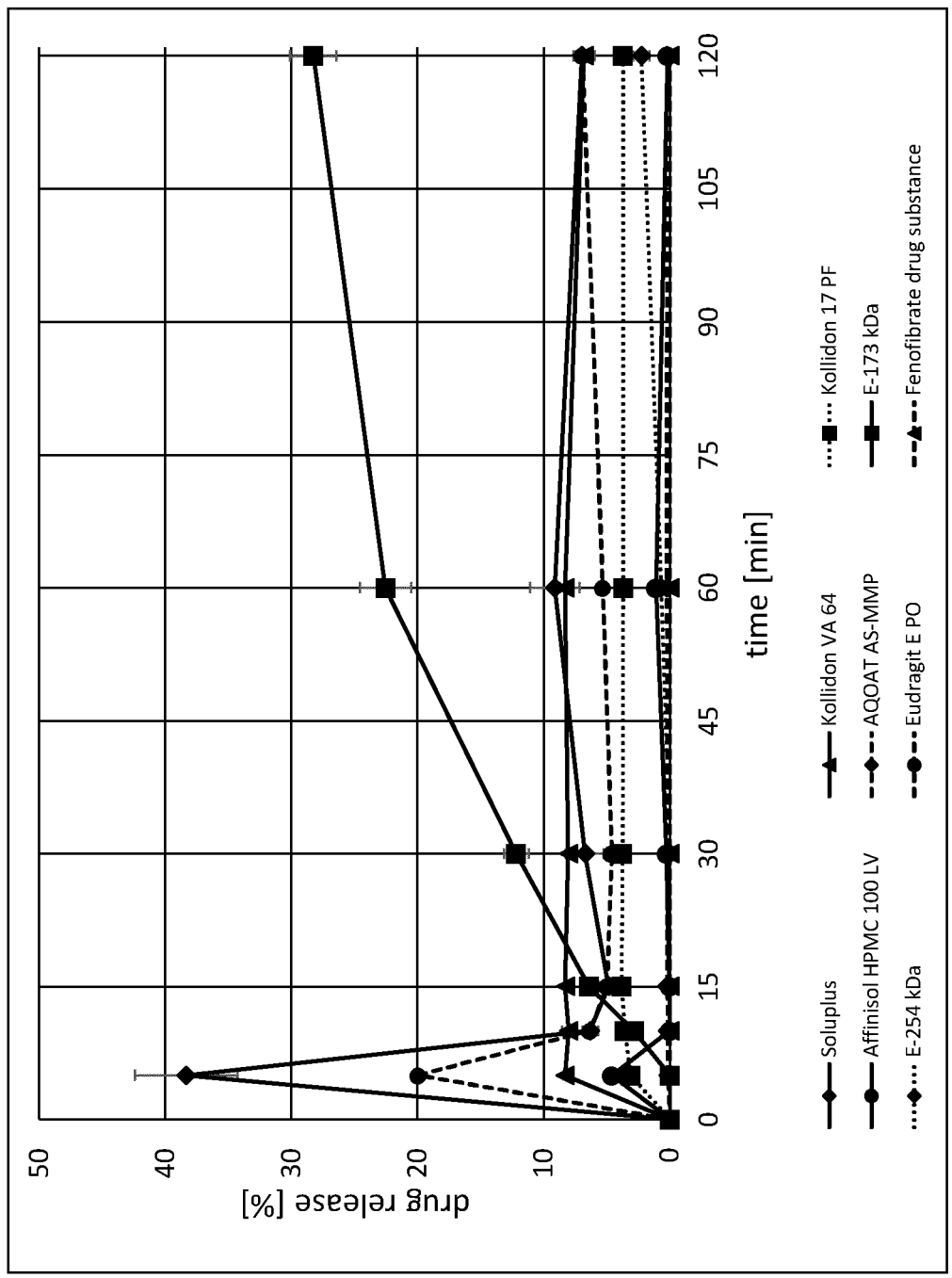
FIG. 1: Dissolution profiles of amorphous solid dispersions (in the following referred to as ASDs as well) incorporating fenofibrate and fenofibrate drug substance in 500 ml 0.1N HCl in USP apparatus II. Each value designates the mean±standard deviation, in the following referred to as S.D. (n=3).
Figure 3:
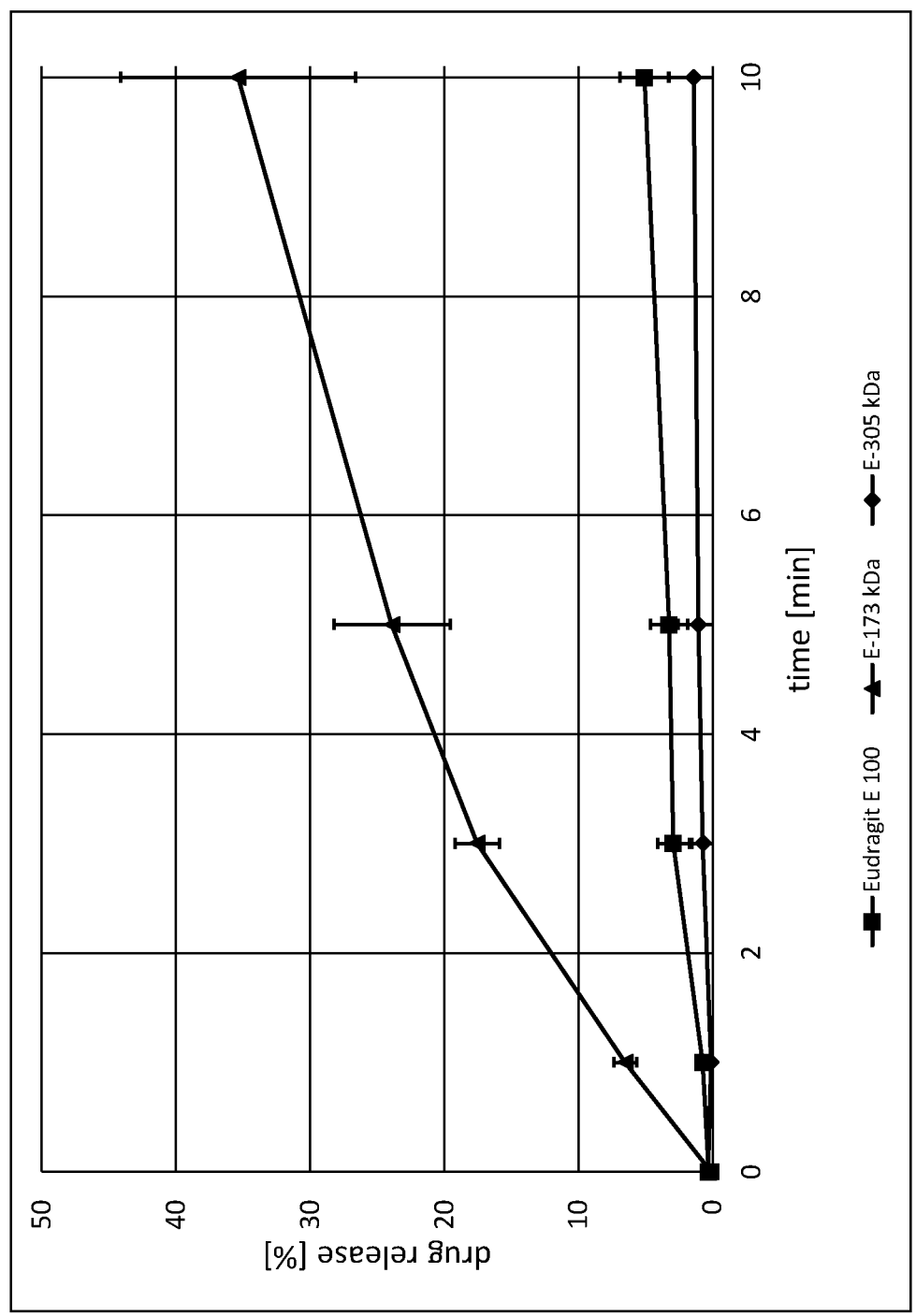
FIG. 3: Dissolution profiles of coated diprophylline-pellets in 250 ml artificial saliva dissolution medium (pH 6.8) in USP apparatus II. Each value designates the mean±S.D. (n=3).

The present invention refers to a methacrylic copolymer comprising or consisting of units derived from
at least one alkyl methacrylate,
preferably at least one $C_{1-5}$ alkyl methacrylate, more preferably at least two $C_{1-5}$ alkyl methacrylates; most preferably methyl methacrylate and butyl methacrylate;
and units derived from methacrylamide,
preferably alkyl methacrylamide or aminoalkyl methacrylamide,
more preferably $C_{1-5}$ alkyl methacrylamide or dimethylamino $C_{1-5}$ alkyl methacrylamide or diethylamino $C_{1-5}$ alkyl methacrylamide, most preferably dimethylaminopropyl methacrylamide, wherein the units derived from methacrylamide, preferably alkyl methacrylamide or aminoalkyl methacrylamide, more preferably $C_{1-5}$ alkyl methacrylamide or dimethylamino $C_{1-5}$ alkyl methacrylamide or diethylamino $C_{1-5}$ alkyl methacrylamide, most preferably dimethylaminopropyl methacrylamide, are present in at least 34 wt.-%, preferably in 35 to 55 wt.-%, more preferably in 45 to 50 wt.-%, based on the total weight of the copolymer.

In one embodiment the methacrylic copolymer has a weight average molecular weight $M_w$ of from 15,000 to 500,000, preferably 50,000 to 350,000 g/mol or 30,000 to 300,000 g/mol or 40,000 to 200,000, more preferably 75,000 to 305,000 g/mol, most preferably 150,000 to 260,000 g/mol. In one embodiment the weight average molecular weight $M_w$ is from 45,000 to 95,000 g/mol.

In one embodiment the methacrylic copolymer has a number average molecular weight $M_n$ of from 10,000 to 150,000, preferably 15,000 to 100,000 g/mol, more preferably 25,000 to 85,000 g/mol, most preferably 35,000 to 75,000 g/mol, in particular 40,000 to 65,000 g/mol. In one embodiment the number average molecular weight $M_n$ is from 16,000 to 25,000 g/mol.

In one embodiment the methacrylic copolymer has a polydispersity of from 2.0 to 10.0, preferably 2.0 to 5.0, more preferably 2.7 to 4.5, most preferably 2.7 to 4.0 or 3.0 to 5.0 or 3.5 to 4.5.

In one embodiment the methacrylic copolymer has a glass transition temperature $T_g$ of from 60 to 100° C., preferably 65 to 95° C., more preferably 70 to 90° C.

In one embodiment the methacrylic copolymer is essentially free of reactive groups, like epoxy groups, which can undergo further polymerization.

In a preferred embodiment the methacrylic copolymer is a dimethylaminopropyl methacrylamide-butyl methacrylate-methyl methacrylate copolymer.

In one embodiment the methacrylic copolymer is in powder form, preferably having an average particle size $D_z$ in the range of from 1 to 1,000 μm, more preferably from 100 to 500 μm. The powder can be obtained by milling and grounding.

A preferred copolymer is dimethylaminopropyl methacrylamide-butyl methacrylate-methyl methacrylate copolymer polymerized from 40 to 60 wt.-%, preferably 45 to 55 wt.-% of dimethylaminopropyl methacrylamide, 15 to 35 wt.-%, preferably 20 to 30 wt.-% of butyl methacrylate and 15 to 35 wt.-%, preferably 20 to 30 wt.-% of methyl methacrylate, whereby the sum of the monomers is 100 wt.-%; wherein the amount of polymerized units of dimethylaminopropyl methacrylamide in the copolymer is at least 34 wt.-%, preferably 35 to 55, more preferably 45 to 50 wt.-% based on the total weight of the copolymer. Preferably, the following amounts of polymerized units are present: 45 to 55 wt.-% of dimethylaminopropyl methacrylamide, 23 to 28 wt.-% of butyl methacrylate, and 23 to 28 wt.-% methyl methacrylate.

Furthermore, the present invention refers to a method of preparing the methacrylic copolymer according to the present invention comprising or consisting of the steps:

performing a free radical polymerization of a monomer mixture comprising or consisting of 40 to 60 wt.-% of a methacrylamide, alkyl methacrylamide or aminoalkyl methacrylamide, preferably $C_{1-5}$ alkyl methacrylamide or dimethylamino $C_{1-5}$ alkyl methacrylamide or diethylamino $C_{1-5}$ alkyl methacrylamide, more preferably dimethylaminopropyl methacrylamide; and 40 to 60 wt.-% of at least one alkyl methacrylate, preferably $C_{1-5}$ alkyl methacrylate, more preferably 10 to 35 wt.-% of butyl methacrylate; and 15 to 40 wt.-% of methyl methacrylate, wherein the sum of the monomers is 100 wt.-%, in the presence of at least one initiator preferably selected from azobisisobutyronitrile, 2,2'-azobis(2-methylpropionitrile), 1,1'-azobis(cyclohexanecarbonitrile), 2,2'-azobis(2-methylpropionamidine) dihydrochloride, ethyl α-bromoisobutyrate, 1,1,1-tris(2-bromoisobutyryloxymethyl)ethane, 2-(2-bromoisobutyryloxy)ethyl methacrylate, bis[2-(2-bromoisobutyryloxy)undecyl] disulfide, 2-bromoisobutanoic acid n-hydroxysuccinimide ester, 3-butynyl 2-bromoisobutyrate, propargyl 2-bromoisobutyrate, camphorquinone, 3-bromopropionitrile, 2-bromopropionitrile, chlorodiphenylmethane, α,α-dichlorotoluene, 2-chloropropionitrile, 2-azidoethyl 2-bromoisobutyrate, 2-bromoisobutyric anhydride, benzyl bromide, cumene hydroperoxide, α-bromoisobutyryl bromide, 4-(chloromethyl)benzoyl chloride, (1-bromoethyl)benzene, ethyl 2-chloropropionate, 2-chloropropionic acid, n-(bromomethyl)phthalimide, methyl α-bromophenylacetate, methyl dichloroacetate, diethyl 2-bromo-2-methylmalonate, 4-isopropylbenzenesulfonyl chloride, tert-butyl α-bromoisobutyrate, 4-tert-butyl-n,n-dimethylaniline, dimethyl 2,6-dibromoheptanedioate, 2-chloropropionyl chloride, diethyl meso-2,5-dibromoadipate, hexamethylphosphoramide, ethyl α-bromophenylacetate, ethyl 2-bromoisobutyrate, trichloromethanesulfonyl chloride, 1,1,1-tris(4-chlorosulfonylphenyl)ethane, methanesulfonyl chloride, 4-methoxybenzenesulfonyl chloride, di-(3,5,5)trimethylhexanoyl peroxide, tert-butyl peroxyneodecanoate, tert-butyl perbenzoate, tert-amyl peroxy-2-ethylhexanoate, bisdecanoyl peroxide, tert-butyl peroxy-2-ethylhexanoate, tert-butyl peroxy-2-ethylhexylcabonate, benzoyl peroxide, 2,2-di-(tert-butylperoxy)butane, dicumyl peroxide, di-tert-amyl peroxide, di-tert-butylperoxide, lauroyl peroxide, tert-butyl peroxy-3,5,5-trimethylhexanoate, 1,1-di-tert-butyl peroxy-3,3,5-trimethylcyclohexane, 2-(1-cyan-1-methylethyl)azocarboxamide, tert-butyl peroxyacetate, tert-butyl peroxypivalate or mixtures thereof, more preferably selected from tert-butyl peroxyneodecanoate and tert-butyl peroxypivalate or mixtures thereof and at least one chain-transfer agent, preferably selected from bromotrichloromethane, thiocholesterol, propargyl acrylate, poly(n,n)-dimethylacrylamide, methyl 4-pentenoate, methyl 2-(bromomethyl)acrylate, L-cysteine, ethene, methane, ethane, propane, trimethylamine, dimethylamine, chloroform, methanol, pentaerythritol tetrakis(3-mercaptopropionate), trimethylolpropane tris(3-mercaptopropionate), 4-methylbenzenethiol, carbon tetrachloride, carbon tetrabromide, isooctyl 3-mercaptopropionate, pentaphenylethane, tert-nonylmercaptan, 4,4'-thiobisbenzenethiol, and n-dodecyl mercaptan or mixtures thereof, preferably n-dodecyl mercaptan; and optionally in the presence of at least one solvent.

A person skilled in the field of polymers knows how to perform a free radical polymerization and can employ suitable process parameters like temperature or reaction time. It is pointed out that free radical polymerization is essentially different from the very specific RAFT-polymerization, which requires specific RAFT chain transfer agents.

In one embodiment the solvent is selected from n-propanol, isopropanol, dichloromethane, ethyl acetate, methanol, ethanol, n-butanol, benzyl alcohol, chloroform, isopropyl acetate, methyl acetate, dimethyl sulfoxide, toluene, methyl ethyl ketone, dimethyl carbonate, hexane, heptane, tert-butyl methyl ether, acetone, dimethylformamide, n-methylformamide, tetrahydrofuran, acetonitrile, n,n-dimethylformamide, acetic anhydride, pyridine, 1,4-dioxane, diethyl ether, benzene, piperidine, carbon disulfide, carbon tetrachloride, triethylamine, 1,3-dimethyl-2-oxo-hexahydropyrimidine, hexamethylphosphoramide, morpholine and cyclohexane or mixtures thereof. In a preferred embodiment the solvent is n-propanol, isopropanol or a mixture thereof.

In one embodiment the reaction is performed in an inert atmosphere, preferably under argon or nitrogen, more preferred under nitrogen.

In one embodiment the reaction is performed under heating, preferably at a temperature of 60 to 90° C.

In one embodiment the reaction is performed for 180 to 420 min, preferably 240 to 360 min.

In one embodiment two initiators are employed, whereby the second initiator is added after 2 h, preferably 3 h, after starting the free radical polymerization, preferably at 70 to 90° C., more preferably at 80 to 85° C.

In one embodiment the initiator, preferably the first initiator, is added to the monomer mixture together with the at least one solvent at a continuous flow rate of 1 to 10 g/min, preferably 3 to 5 g/min.

In one embodiment the at least one chain-transfer agent is added to the mixture having a temperature of 50 to 70° C., preferably 60 to 65° C., preferably before the addition of the (first) initiator.

In one embodiment the reaction is performed under stirring.

The monomer conversion rate of the monomers in the method is preferably 85 wt.-% or more for dimethylaminopropyl methacrylamide, 95 wt.-% or more for butyl methacrylate and 95 wt.-% or more for methyl methacrylate.

When the initial amount of the dimethylaminopropyl methacrylamide in the monomer feed is known, the amounts (weight) of polymerized units of dimethylaminopropyl methacrylamide in the copolymer may be determined by the analysis of the total and individual residual monomer contents (ReMo) and can then be calculated accordingly. The total and individual residual monomer contents can be determined by High Pressure Liquid Chromatography (HPLC). The determination of the total and individual residual monomer contents by HPLC is well known to a skilled person.

The monomers dimethylaminopropyl methacrylamide, butyl methacrylate and methyl methacrylate are usually radically polymerized at different conversion rates in the reaction. Slight differences depend on the polymerization conditions. The monomer conversion rate of butyl methacrylate and methyl methacrylate are comparably high and in the same range of about 95 wt.-% or more, more than 95 up to 99.9 wt.-% of polymerized monomers compared to the initial monomer feed. The monomer conversion rate of dimethylaminopropyl methacrylamide is comparably somewhat lower than that of butyl methacrylate and methyl methacrylate and about 85 wt.-% or more, 85 up to 95 wt.-% of polymerized monomers compared to the initial monomer feed. This means that when the weight ratio of dimethylaminopropyl methacrylamide:butyl methacrylate:methyl methacrylate is for instance 50:25:25 weight ratio in the initial monomer feed, the proportion of polymerized units in the copolymer may differ for instance by 47:26:27. The conversion rates also slightly depend on the polymerization conditions such as temperature and duration of the reaction as well as the choice of polymerization initiator and chain-transfer-agent.

An exemplary process for the preparation of dimethylaminopropyl methacrylamide-butyl methacrylate-methyl methacrylate copolymer is as follows. The monomers dimethylaminopropyl methacrylamide (e.g. 500.0 g), butyl methacrylate (e.g. 250.0 g) and methyl methacrylate (e.g. 250.0 g) are added in a mixing equipment, for instance into a 3,000 ml round-bottom flask equipped with a magnetic bar, a return condenser and a nitrogen inlet. The reaction vessel is placed in a preheated water bath at 70 to 90° C., e.g. 82° C. When reaching an internal temperature of about 60 to 70° C., e.g. 65° C., n-dodecyl mercaptan (e.g. 3.0 g, 5.0 g, 9.0 g or 15.0 g) is added to control the molecular weight of the polymer during the process, while a solution of 0.1 to 1 wt.-% (calculated on weight of the monomers) of tert-butyl peroxyneodecanoate (e.g. 6.0 g) and 80 to 120 wt.-% (calculated on weight of the monomers) n-propanol (e.g. 1,000 g) is added, for instance with a continuous flow rate of 2 to 10 g/min, e.g. 5 g/min, to initiate a radical polymerization. After about 2 to 4 hours, e.g. 3 h, at a temperature between 80-85° C., 0.1 to 1 wt.-% (calculated on weight of the monomers) of a second initiator, e.g. tert-butyl peroxypivalate (e.g. 0.5 g) is used to complete the reaction, for instance for 60 to 120 min, e.g. for 90 min. The mixture may be cooled down and may be transferred to an oven at 30 to 50° C., e.g. 40° C., in order to remove n-propanol, e.g. over 48 h. The polymer may be purified using deionized water as purifying medium to remove residual monomers as well as residual organic solvent and may be dried afterwards, e.g. over 10 days at 50° C. The dry, coarse polymer may be ground and milled (e.g. mesh size: 0.25 mm) using an Ultra Centrifugal Mill ZM 200 from Retsch GmbH (Haan, Germany).

In addition, the present invention refers to a pharmaceutical composition, comprising at least one methacrylic copolymer according to the present invention and at least one pharmaceutically active ingredient, wherein the pharmaceutical composition is preferably an amorphous solid dispersion.

Any pharmaceutically active ingredient or mixtures of pharmaceutically active ingredients known to the skilled person may be incorporated in the pharmaceutical compositions. However, the pharmaceutical compositions of the present invention are very useful for poorly water soluble pharmaceutically active ingredients or for pharmaceutically active ingredients which show a high loss of drug release after storage. Preferably, the pharmaceutically active ingredient may be a drug poorly water soluble after peroral administration.

The pharmaceutically active ingredient may show a solubility of less than 0.1 mg of pharmaceutically active ingredient, preferably of the pure pharmaceutically active ingredient, in 1 ml water at 37° C. (as defined for poorly insoluble drugs in the USP). The determination of the solubility of the pharmaceutically active ingredient is well known to a person skilled in the art. For instance, an excess amount of the pharmaceutically active ingredient is placed in a certain amount of water and mixed. The dissolved amount of the pharmaceutically active ingredient is then determined by a suitable analytical method, for instance by spectrometry.

In one embodiment the at least one pharmaceutically active ingredient may be selected from acalabrutinib, albendazole, alendronic acid, aripiprazole, asenapine, atazanavir, atorvastatin, BETd-260, bleomycin, bosentan, BRD4 degrader AT1, buprenorphine, budesonide, camostat, candesartan, carbamazepine, carvedilol, celecoxib, cilazapril, clarithromycin, clodronic acid, clopidogrel, curcumin, cytarabine, darunavir, dasatinib, deferasirox, dexamethasone, dexlansoprazole, diclofenac, diltiazem, docetaxel, doxorubicin, duloxetine, dutasteride, efavirenz, elbasvir, eprosartan, erlotinib, estradiol, etidronic acid, etravirine, everolimus, ezetimibe, felodipine, fenofibrate, fluconazole, fluorouracil, foretinib-based PROTAC 7, glimepiride, grazoprevir, griseofulvin, hydrochlorothiazide, hydrocortisone, hydroxychloroquine, ibuprofen, imatinib, irbesartan, irinotecan, itraconazole, ivacaftor, ivermectin, ledipasvir, lamotrigine, linezolid, lisinopril, lopinavir, losartan, mefloquine, mesalazine, methotrexate, metoprolol, modafinil, moexipril, morphine, mycophenolate, naloxone, nifedipine, nilotinib, nilvadipine, nitrendipine, olanzapine, olmesartan, omeprazole, ondansetron, paclitaxel, pamidronic acid, paracetamol, pemetrexed, perindopril, phenytoin, pibrentasvir, pioglitazone, prednisone, progesterone, quetiapine, raloxifene, raltegravir, ramipril, rebamipide, remdesivir, rilpivirine, risedronic acid, risperidone, ritonavir, rivaroxaban, rivastigmine, rosuvastatin, selegiline, sevelamer, sibutramine, sildenafil, simvastatin, sirolimus, sitagliptin, sofosbuvir, sorafenib, spirapril, sunitinib, tacrolimus, tadalafil, tamoxifen, telaprevir, telmisartan, tenoxicam, terbutaline, ticagrelor, tiludronic acid, trandolapril, troglitazone, umifenovir, valsartan, velpatasvir, vemurafenib, verapamil, ziprasidone, zoledronic acid and ZXH-3-26, or, where applicable, from pharmaceutically acceptable salt forms thereof or mixtures thereof.

Preferably, the at least one pharmaceutically active ingredient may be selected from celecoxib, efavirenz, and fenofibrate or mixtures thereof.

The at least one pharmaceutically active ingredient can be present in 0.1 to 50 wt.-%, preferably 5 to 50 wt.-%, 10 to 25 wt.-%, based on the total weight of the composition.

The pharmaceutical composition can further comprise at least one additive. Any additive which can be used for pharmaceutical compositions is in general suitable.

In a preferred embodiment less than 50 wt.-%, preferably less than 20 wt.-%, more preferably less than 10 wt.-% of additives are present, based on the total weight of the composition.

Additives are preferably selected from antiadherents, like magnesium stearate; fillers, like lactose, mannitol, starches, cellulose and their derivatives; binders, like polyacrylates, starches, guar, xanthan, alginate, carrageenan, pectin, tragacanth, polysaccharides and their derivatives; flavors, like mint, cherry, anise, vanilla, raspberry; colors, like natural colorants, azo—and xanthene compounds; pigments, like titanium dioxides, iron oxides, magnesium oxide; disintegrants, like starches, croscarmellose, crosslinked polyvinylpyrrolidone, sodium hydrogen carbonate, preferably in combination with citric acid (for effervescent tablets); glidants, like silica, fumed silica, talc, magnesium carbonate; flow regulators, like highly dispersed silicon dioxide; antioxidants like vitamin A, vitamin E, vitamin C, retinyl palmitate, selenium, butylated hydroxyanisole, butylated hydroxytoluene; sweeteners, like sucrose, sorbitol, saccharin sodium, cyclamate, aspartame; and antistatics, like alkyl sulfonates or quaternary ammonium compounds, preferably combined with polystyrene; or mixtures thereof.

The pharmaceutical formulation may be present in the form of tablets, orodispersible tablets, pills, pellets, capsules, dragees, and granules.

In a preferred embodiment the pharmaceutical composition is or comprises an amorphous solid dispersion. Amorphous solid dispersions are known to the skilled person and for example disclosed in U.S. Pat. No. 6,391,338 B1. The compositions of this reference as well as the method of manufacturing the compositions are included by reference, whereby the water-soluble polymer of this reference is replaced by the methacrylic copolymer according to the present invention.

Amorphous solid dispersions are common in the field of pharmaceutical compositions. Amorphous solid dispersions can for example be obtained by hot melt extrusion, spray drying, adsorption, electrospinning, electrospraying, prilling by vibration, granulation or supercritical fluidization. It is preferred to employ hot melt extrusion in the present invention.

The obtained amorphous solid dispersions obtained by hot melt extrusion, i.e. the extrudates, can be further processed into a pharmaceutical formulation.

This pharmaceutical formulation may be present in the form of tablets, orodispersible tablets, pellets, capsules, dragees, and granules.

To prepare the extrudates the pharmaceutically active ingredient is mixed with at least one methacrylic copolymer according to the present invention. Optionally at least one plasticizer can be present. This mixture is introduced into an extruder and processed there to a homogeneous melt.

The skilled person in the field of hot melt extrusion knows how to perform the hot melt extrusion and can choose a suitable temperature, extrusion speed, and torque.

The extrudate obtained is typically in strands of different lengths, which are randomly broken after exiting the extruder after cooling. These can be ground with a mill, e.g. a centrifugal mill, to obtain fractions of a certain particle size. Depending on the grinding process, one can produce particles of different sizes. Typically, the $D_z$ is 1 to 1000 µm. the $D_z$ is measured via Laser diffraction in accordance with DIN ISO 13320:2020-01.

The extrudates obtained can be further processed in a manner known per se into medicaments, in particular solid dosage forms.

Solid dosage forms, such as pellets, pills, capsules and tablets, are preferred according to the invention. These can be coated or uncoated. Tablets can be prepared, for example, by dry compaction or direct compression of the comminuted, in particular ground, amorphous solid dispersion. Both fast-release and sustained release dosage forms can be produced.

For example, pellets can be made by cutting strands upon exiting an extruder and then cooling. In particular, a micropelletizer connected behind the extruder is suitable for this purpose. For the production of granules, for example, a granulator connected behind an extruder and a cooling belt is suitable, which cuts the solidified strands into granules.

For the preparation of capsules the amorphous solid dispersion can be ground and optionally mixed with other auxiliaries, such as fillers and flow control agents, and filled into capsules, for example gelatin capsules.

The formulation of the amorphous solid dispersion into tablets is carried out with customary pharmaceutical auxiliaries. Suitable auxiliaries are for example fillers, binders, disintegrants, flow regulators, glidants, and flavoring agents.

The pharmaceutical formulation according to the invention may contain, for example, 0 to 90 wt.-% of auxiliaries in addition to the amorphous solid dispersion, based on the total weight of the formulation.

The content of disintegrants may be in the range of 1 to 40 wt.-%, preferably 20 to 30 wt.-%, depending on the disintegrant used, the fillers and the other additives, based on the total weight of the formulation.

The content of glidants is preferably in the range of 0.1 to 4 wt.-%, more preferably 0.5 wt.-%, based on the total weight of the formulation.

As fillers one or more compounds may be used, e.g. microcrystalline cellulose, starch, cellulose powder, lactose, in particular spray-dried lactose, glucose, mannitol and sorbitol.

Suitable disintegrants are starch, especially corn starch, alginic acid and its salts and derivatives such as calcium alginate and sodium alginate, sodium carboxymethyl cellulose, polyacrylic acid, cross-linked polyvinyl pyrrolidone, cross-linked sodium carboxymethyl cellulose, cross-linked sodium carboxymethyl starch, low substituted sodium carboxymethyl cellulose, sodium bicarbonate and magnesium peroxide or mixtures thereof.

Suitable glidants include, for example, magnesium stearate, calcium behenate, glycerol monostearate, stearic acid, hydrogenated vegetable fats, polyethylene glycol, sodium dodecylsulfate, magnesium dodecylsulfate and talcum or mixtures thereof.

As a flow control agent, for example, fumed silica is suitable.

The pharmaceutical composition or the pharmaceutical formulation can be coated.

The tablet weight is not particularly limited, ordinary tablets are 100 to 800 mg, e.g. 300 to 400 mg.

Moreover, the present invention refers to a nutraceutical composition, comprising at least one methacrylic copolymer according to the present invention and at least one nutraceutically active ingredient.

Examples of nutraceuticals are resveratrol from grape products as an antioxidant, soluble dietary fiber products, such as psyllium seed husks to reduce hypercholesterolemia, broccoli (sulfane) as a cancer preservative and soy or clover (isoflavonoids) to improve arterial health. Other examples of nutraceuticals are flavonoids, amino acids, antioxidants, pyrroloquinoline quinone, omega-3 fatty acids, vitamins, alpha-linoleic acid from flax seeds, beta-carotene from marigold petals or anthocyanins from berries.

Preferred nutraceutical compositions can have the same composition as the above-described pharmaceutical compositions and formulations, except that the at least one pharmaceutically active ingredient is replaced by at least one nutraceutically active ingredient.

In a further aspect, the present invention refers to coated pharmaceutical or nutraceutical dosage form, wherein the coating comprises at least one methacrylic copolymer according to the present invention, wherein the coated pharmaceutical dosage form is preferably a pill, tablet or capsule.

Exemplarily coated capsules and coating methods are for example disclosed in WO 2019096833 A1, whereas the polymer is replaced by the methacrylic copolymer according to the present invention. Exemplarily coating compositions and their manufacturing methods are disclosed in U.S. Pat. No. 4,452,862, whereas the polymer is replaced by the methacrylic copolymer according to the present invention.

Any known core of pharmaceutical or nutraceutical compositions is in general suitable.

In one embodiment the core is a diprophylline pellet.

In general, the coating comprising the at least one methacrylic copolymer according to the present invention can further comprise commonly used compounds for coatings, for example plasticizers, preferably triethyl citrate, and glidants, for example talc.

In one embodiment the coating is applied via spray coating, preferably bottom-spray coating.

Additionally, the present invention refers to a nano- or microparticle comprising at least one methacrylic copolymer according to the present invention, preferably as carrier.

The type of nano- or microparticle is in general not limited, as long as the at least one methacrylic copolymer according to the present invention can be employed.

In one embodiment the nano- or microparticle further comprises a biologically active ingredient. Such nano- or microparticle can for example be obtained by a solvent emulsion process comprising an organic phase (OP) and an aqueous phase (AP) to form an emulsion, wherein, in the case of an oil-in-water emulsion (O/W), the organic phase (OP) comprises the biologically active ingredient dissolved or dispersed therein or wherein, in the case of a water-in-oil emulsion ($W_1/O$), the aqueous phase (AP) comprises the biologically active ingredient dissolved or dispersed therein, comprising the steps:
a) providing the organic phase (OP) comprising a partially water-miscible organic solvent or solvent mixture (S1), wherein the organic phase (OP) is saturated with the aqueous phase (AP) and wherein the organic phase (OP) comprises the methacrylic copolymer according to the present invention and optionally the biologically active ingredient dissolved or dispersed therein,
b) providing the aqueous phase (AP), comprising an aqueous solvent or solvent mixture (S2), comprising water and a pharmaceutically acceptable salt dissolved therein, wherein the salt-containing aqueous phase is further saturated with the solvent or solvent mixture (S1) of the organic phase (OP) and is comprising an emulsion-stabilizing agent and optionally the biologically active ingredient dissolved or dispersed therein,
c) mixing the organic phase (OP) and the aqueous phase (AP) to gain an oil-in-water emulsion (O/W) or a water-in-oil emulsion ($W_1/O$),
d) in the case of a water-in-oil emulsion ($W_1/O$), addition of an excess of further aqueous phase (AP) to gain a water-in-oil-in-water emulsion ($W_1/O/W_2$),
e) removing the organic solvent or solvent mixture (S1) from the oil-in-water emulsion (O/W) from step c) or from the water-in-oil-in-water emulsion ($W_1/O/W_2$) from step d) by evaporation and/or extraction to promote the formation of nano- or microparticles comprising the methacrylic copolymer according to the present invention and the biologically active ingredient in a remaining aqueous suspension,
f) separating the nano- or microparticles from the aqueous suspension.

In one embodiment of the process, the nano- or microparticles are separated from the aqueous suspension in step f) by filtration or centrifugation, washing, and/or evaporation and/or drying.

In one embodiment of the process, the nano- or microparticles have a particle size $D_{50}$ in the range of about 500 nm to 1000 μm.

In one embodiment of the process, the biologically active ingredient is selected from the BCS-Classes II and IV.

In one embodiment of the process the biologically active ingredient is selected from albendazole, alendronic acid, aripiprazole, asenapine, atazanavir, atorvastatin, bleomycin, bosentan, buprenorphine, budesonide, candesartan, carbamazepine, carvedilol, celecoxib, cilazapril, clarithromycin, clodronic acid, clopidogrel, curcumin, cytarabine, darunavir, dasatinib, deferasirox, dexamethasone, dexlansoprazole, diclofenac, diltiazem, docetaxel, doxorubicin, duloxetine, dutasteride, efavirenz, elbasvir, eprosartan, erlotinib, estradiol, etidronic acid, etravirine, everolimus, ezetimibe, fenofibrate, fluconazole, fluorouracil, glimepiride, grazoprevir, grisevulvin, hydrocortisone, ibuprofen, imatinib, irbesartan, irinotecan, itraconazole, ivacaftor, ledipasvir, lamotrigine, linezolid, lisinopril, lopinavir, losartan, mesalazine, methotrexate, metoprolol, modafinil, moexipril, morphine, mycophenolic acid, naloxone, nifedipine, nilotinib, nilvadipine, nitrendipine, olanzapine, olmesartan, omeprazole, ondansetron, paclitaxel, pamidronic acid, paracetamol, pemetrexed, perindopril, pioglitazone, prednisone, progesterone, quetiapine, raloxifene, raltegravir, ramipril, rebamipide, risedronic acid, risperidone, ritonavir, rivaroxaban, rivastigmine, rosuvastatin, selegiline, sevelamer, sibutramine, sildenafil, simvastatin, sirolimus, sitagliptin, sofosbuvir, sorafenib, spirapril, sunitinib, tacrolimus, tadalafil, tamoxifen, telaprevir, telmisartan, tenoxicam, terbutaline, ticagrelor, tiludronic acid, trandolapril, valsartan, velpatasvir, vemurafenib, verapamil, ziprasidone, zoledronic acid, or, where applicable, from pharmaceutically acceptable salt forms thereof.

In an alternative embodiment the biologically active ingredient is the above-described pharmaceutically active ingredient or the above-described nutraceutically active ingredient.

In one embodiment of the process the aqueous phase (AP) comprises about 1 to 50% by weight of the pharmaceutically acceptable salt.

In one embodiment of the process the pharmaceutically acceptable salt is selected from sodium chloride, potassium chloride, sodium sulfate, potassium sulfate, magnesium chloride, magnesium sulfate, calcium chloride, sodium acetate, potassium acetate, magnesium acetate, ammonium acetate, ammonium sulfate and ammonium chloride or any mixtures thereof.

In one embodiment of the process the solvent or solvent mixture (S1) has a miscibility in water of 0.1 to 35% by weight at 25° C.

In one embodiment of the process the solvent or solvent mixture (S1) is selected from n-butan-1-ol, n-butyl acetate, iso-butyl acetate, dichloromethane, chloroform, benzyl alcohol, methylethylketone, diethyl ketone, methyl propyl ketone, isopropyl methyl ketone, tert-butyl methyl ether, diethyl ether, di-isopropyl ether, dimethyl carbonate, diethyl carbonate, iso-propyl acetate, propyl acetate, methyl acetate, methyl formiate, butyl formiate, iso-butyl formiate, ethyl formiate, benzoic acid methyl ester, malonic acid diethyl ester, malonic acid dimethyl ester, methyl-iso-butyl ketone, 2-methyl-1-propanol, methyl butyrate, ethyl butyrate, iso-propyl butyrate, benzoic acid methyl ester, methyl tetrahydrofuran, 2,2-dimethyl tetrahydrofuran, 2,2,5,5-tetramethyl tetrahydrofuran and 2,5-dimethyl furan, 3-methoxy-3-methyl-1-butanol, 1-methoxy-2-propanyl acetate, 1-methoxy propyl acetate, 3-methoxy-1-butanol, acetaldehyde dimethyl acetal, acetaldehyde diethyl acetal and mixtures of two or more thereof.

In one embodiment of the process the mixing in step c) is carried out by using a static mixer, stirred or pulsed extraction columns, a bead packed column, a Pall- or Raschig-ring packed column, a packed column by Sulzer or Raschig metal packs, a rotor stator mixing system, a baffled reactor, a oscillatory baffled reactor, a continuous baffled reactor, a laminar jet break up apparatus, a crossflow membrane emulsification apparatus, a premix-membrane emulsification apparatus, a swirl flow membrane emulsification apparatus, a microfluidic apparatus (working in co-flow, tangential cross flow or flow focusing principle), or a microstructure membrane emulsification apparatus.

In one embodiment of the process the aqueous phase (AP) comprises about 0.001 to 5% by weight of the emulsion-stabilizing agent, preferably selected from polyvinyl alcohol and polysorbate.

Finally, the present invention refers to the use of the at least one methacrylic copolymer according to any of the present invention as coating; as carrier; or as matrix for an amorphous solid dispersion.

The Invention in Particular Pertains to:
1. Methacrylic copolymer comprising or consisting of units derived from
   at least one alkyl methacrylate,
   preferably at least one $C_{1-5}$ alkyl methacrylate;
   more preferably methyl methacrylate and butyl methacrylate;
   and units derived from methacrylamide,
   preferably alkyl methacrylamide or aminoalkyl methacrylamide, more preferably $C_{1-5}$ alkyl methacrylamide or dimethylamino $C_{1-5}$ alkyl methacrylamide or diethylamino $C_{1-5}$ alkyl methacrylamide,
   most preferably dimethylaminopropyl methacrylamide, wherein the units derived from methacrylamide, preferably dimethylaminopropyl methacrylamide, are present in at least 34 wt.-% or 40 wt.-%, preferably in 35 to 55 wt.-% or 40 to 55 wt.-%, more preferably in 45 to 50 wt.-%, based on the total weight of the copolymer.
2. Methacrylic copolymer according to item 1, wherein the methacrylic copolymer has
   i) a weight average molecular weight $M_w$ of from 15,000 to 500,000 g/mol, preferably 30,000 to 300,000 g/mol, more preferably 40,000 to 200,000 g/mol; and/or
   ii) a number average molecular weight $M_n$ of from 10,000 to 150,000, preferably 15,000 to 100,000 g/mol, more preferably 18,000 to 85,000 g/mol; and/or
   iii) a polydispersity of from 2.0 to 10.0, preferably 2.0 to 5.0, more preferably 3.5 to 4.5; and/or
   iv) a glass transition temperature $T_g$ of from 60 to 100° C., preferably 65 to 95° C., more preferably 75 to 90° C.
3. Methacrylic copolymer according to item 1 or 2, wherein the methacrylic copolymer is a dimethylaminopropyl methacrylamide-butyl methacrylate-methyl methacrylate copolymer.
4. Method of preparing the methacrylic copolymer according to any of items 1 to 3 comprising or consisting of the steps:
   performing a free radical polymerization of a monomer mixture comprising or consisting of 40 to 60 wt.-%, preferably 45 to 55 wt.-%, of a methacrylamide, alkyl methacrylamide or aminoalkyl methacrylamide, preferably $C_{1-5}$ alkyl methacrylamide or dimethylamino $C_{1-5}$ alkyl methacrylamide or diethylamino $C_{1-5}$ alkyl methacrylamide, more preferably dimethylaminopropyl methacrylamide; and
   40 to 60 wt.-% of at least one alkyl methacrylate, preferably $C_{1-5}$ alkyl methacrylate, more preferably 10 to 35 wt.-% of butyl methacrylate; and
   15 to 40 wt.-% of methyl methacrylate, wherein the sum of the monomers is 100 wt.-%, in the presence of at least one initiator preferably selected from 2,2'-azobis(2-methylpropionitrile), 1,1'-azobis(cyclohexanecarbonitrile), 2,2'-azobis(2-methylpropionamidine) dihydrochloride, ethyl α-bromoisobutyrate, 1,1,1-tris(2-bromoisobutyryloxymethyl) ethane, 2-(2-bromoisobutyryloxy)ethyl methacrylate, bis[2-(2-bromoisobutyryloxy)undecyl]disulfide, 2-bromoisobutanoic acid n-hydroxysuccinimide ester, 3-butynyl 2-bromoisobutyrate, propargyl 2-bromoisobutyrate, camphorquinone, 3-bromopropionitrile, 2-bromopropionitrile, chlorodiphenylmethane, α,α-dichlorotoluene, 2-chloropropionitrile, 2-azidoethyl 2-bromoisobutyrate, 2-bromoisobutyric anhydride, benzyl bromide, cumene hydroperoxide, α-bromoisobutyryl bromide, 4-(chloromethyl)benzoyl chloride, (1-bromoethyl)benzene, ethyl 2-chloropropionate, 2-chloropropionic acid, n-(bromomethyl)phthalimide, methyl α-bromophenylacetate, methyl dichloroacetate, diethyl 2-bromo-2-methylmalonate, 4-isopropylbenzenesulfonyl chloride, tert-butyl α-bromoisobutyrate, 4-tert-butyl-n,n-dimethylaniline, dimethyl 2,6-dibromoheptanedioate, 2-chloropropionyl chloride, diethyl meso-2,5-dibromoadipate, hexamethylphosphoramide, ethyl α-bromophenylacetate, ethyl 2-bromoisobutyrate, trichloromethanesulfonyl chloride, 1,1,1-tris(4-chlorosulfonylphenyl)ethane, methanesulfonyl chloride, 4-methoxybenzenesulfonyl chloride, di-(3,5,5)trimethylhexanoyl peroxide, tert-butyl peroxyneodecanoate, tert-butyl perbenzoate, tert-amyl peroxy-2-ethylhexanoate, bisdecanoyl peroxide, tert-butylperoxy-2-ethylhexanoate, tert-butyl peroxy-2-ethylhexylcabonate, benzoyl peroxide, 2,2-di-(tert-butylperoxy)butane, dicumyl peroxide, di-tert-amyl peroxide, di-tert-butylperoxide, lauroylperoxide, tert-butylperoxy-3,5,5-trimethylhexanoate, 1,1-di-tert-butylperoxy-3,3,5-trimethylcyclohexane, 2-(1-cyan-1-methylethyl)azocarboxamide, tert-butylperoxyacetate, tert-butyl peroxypivalate or mixtures thereof, more preferably selected from tert-butyl peroxyneodecanoate and tert-butyl peroxypivalate or mixtures thereof; and
    at least one chain-transfer agent, preferably selected from bromotrichloromethane, thiocholesterol, propargyl acrylate, poly(n,n)-dimethylacrylamide, methyl 4-pentenoate, methyl 2-(bromomethyl)acrylate, L-cysteine, ethene, methane, ethane, propane, trimethylamine, dimethylamine, chloroform, methanol, pentaerythritol tetrakis(3-mercaptopropionate), trimethylolpropane tris(3-mercaptopropionate), 4-methylbenzenethiol, carbon tetrachloride, carbon tetrabromide, isooctyl 3-mercaptopropionate, pentaphenylethane, tert-nonylmercaptan, 4,4'-thiobisbenzenethiol, and n-dodecyl mercaptan or mixtures thereof, preferably n-dodecyl mercaptan; and
    optionally in the presence of at least one solvent.
5. Pharmaceutical composition, comprising at least one methacrylic copolymer according to any of items 1 to 3 and at least one pharmaceutically active ingredient, wherein the pharmaceutical composition is or comprises preferably an amorphous solid dispersion.
6. Nutraceutical composition, comprising at least one methacrylic copolymer according to any of items 1 to 3 and at least one nutraceutically active ingredient.
7. Coated pharmaceutical or nutraceutical dosage form, wherein the coating comprises at least one methacrylic copolymer according to any of items 1 to 3, wherein the coated pharmaceutical dosage form is preferably a pill, tablet, granule, pellet or capsule.
8. Nano- or microparticle comprising at least one methacrylic copolymer according to any of items 1 to 3, preferably as carrier.
9. Use of the at least one methacrylic copolymer according to any of items 1 to 3 as coating; as carrier; or as matrix for an amorphous solid dispersion.

EXAMPLES

Materials & Methods

Materials

Fenofibrate (propan-2-yl 2-[4-(4-chlorobenzoyl)phenoxy]-2-methylpropanoate) obtained from D.K. Pharma Chem PVT Ltd. (Maharashtra, India) and diprophylline (7-(2,3-dihydroxypropyl)-3,7-dihydro-1,3-dimethyl-1H-purine-2,6-dione) received from NBS Biologicals (Huntingdon, United Kingdom) were used as model compounds. Novel dimethylaminopropyl methacrylamide-butyl methacrylate-methyl methacrylate copolymers (2:1:1) (E-173 kDa, E-254 kDa, E-281 kDa, E-305 kDa) are in-house products of research studies from Evonik Nutrition & Care GmbH (Darmstadt, Germany). Polyvinyl caprolactam-polyvinyl acetate-polyethylene glycol graft copolymer (Soluplus®), polyvinylpyrrolidone-polyvinyl acetate copolymer (Kollidon® VA 64) and polyvinylpyrrolidone (Kollidon® 17 PF) were purchased from BASF SE (Ludwigshafen, Germany). Hydroxypropyl methylcellulose acetate succinate (AQOAT® AS-MMP) was kindly donated by Shin-Etsu Chemical Co., Ltd. (Tokio, Japan). Hydroxypropyl methylcellulose (Affinisol® HPMC 100 LV) was provided by Dow Chemical Company (Schwalbach am Taunus, Germany). Dimethylaminoethyl methacrylate-butyl methacrylate-methyl methacrylate (EUDRAGIT® E PO (powder form), EUDRAGIT® E 100 (granules) of the same polymer) is a commercially available product from Evonik Nutrition & Care GmbH (Darmstadt, Germany). Triethyl citrate, isopropanol, acetone, sodium chloride, potassium chloride, potassium carbonate, disodium hydrogen phosphate, sodium dihydrogen phosphate, calcium chloride and magnesium chloride were purchased from Merck KGaA (Darmstadt, Germany). Talc was provided by Imerys S.A. (Paris, France). All other chemicals were of analytical grade and purchased commercially.

Methods

Examples 1 to 4

Preparation of the Novel Dimethylaminopropyl Methacrylamide-Butyl Methacrylate-Methyl Methacrylate Copolymer (2:1:1 (Ratios by Weight))

For the preparation of dimethylaminopropyl methacrylamide-butyl methacrylate-methyl methacrylate copolymers the monomers dimethylaminopropyl methacrylamide (500.0 g), butyl methacrylate (250.0 g) and methyl methacrylate (250.0 g) were added into a 3,000 ml round-bottom flask equipped with a magnetic bar, a return condenser and a nitrogen inlet. The reaction vessel was placed in a preheated water bath at 82° C. When reaching an internal temperature of 65° C. n-dodecyl mercaptan (3.0 g, 5.0 g, 9.0 g or 15.0 g) was added immediately to control the molecular weight of the polymer during the process, while a solution of tert-butyl peroxyneodecanoate (6.0 g) and n-propanol (1,000 g) was added with a continuous flow rate of 5 g/min to initiate a radical polymerization. After approximately 3 h at a temperature between 80 to 85° C., the second initiator, the tert-butyl peroxypivalate (0.5 g), completed the reaction within another 90 min. The mixture was cooled down and transferred to an oven at 40° C. in order to remove n-propanol over 48 h. The polymer was purified using deionized water and was dried afterwards over 10 days at 50° C. The dry, coarse polymer was ground (mesh size: 0.25 mm) using an Ultra Centrifugal Mill ZM 200 from Retsch GmbH (Haan, Germany).

Obtained were four copolymers having different weight average molecular weights of 173 kDa, 254 kDa, 281 kDa, and 305 kDa, referred to as polymers E-173 kDa, E-254 kDa, E-281 kDA, and E-305 kDA in the following.

Residual Monomer (ReMo) Analysis & Monomer Conversion Rate

The residual monomers of the dimethylaminopropyl methacrylamide-butyl methacrylate-methyl methacrylate copolymers were analyzed before drying using HPLC analysis regarding dimethylaminopropyl methacrylamide as well as GC analysis referring to butyl methacrylate and methyl methacrylate. Based on the results of the residual monomer analysis (6.16% by weight for dimethylaminopropyl methacrylamide, 0.002% by weight for butyl methacrylate and 0.035% by weight for methyl methacrylate) considering a monomer ratio of 2:1:1 (dimethylaminopropyl methacrylamide:butyl methacrylate:methyl methacrylate), the average monomer conversion rate was calculated at 87.68% for dimethylaminopropyl methacrylamide, 99.99% for butyl methacrylate and 99.86% for methyl methacrylate. That leads to a final polymer composition of 46.74% by weight for dimethylaminopropyl methacrylamide, 26.65% by weight for butyl methacrylate and 26.61% by weight for methyl methacrylate, based on the total weight of the copolymer.

Gel Permeation Chromatography (GPC)

The molecular weight distribution of dimethylaminopropyl methacrylamide-butyl methacrylate-methyl methacrylate copolymers were determined by using an Agilent 1100 Series GPC-SEC Analysis System comprising a pump (G1310A), autosampler (G1313A), column oven (G1316A), RI-detector (G1362A) and a control module (G1323B) obtained from Agilent Technologies (Frankfurt am Main, Germany). Separation was achieved using a GRAM precolumn (8×50 mm, 10 µm) and another three GRAM columns (8×300 mm, 10 µm) all maintained at 60° C. The eluent consisted of n,n-dimethylacetamide:lithium bromide:tris (hydroxymethyl)aminomethane (TRIS):water (1000:2:2:10 w/w), the flow rate was set to 1 ml/min and an injection volume of 100 µl was applied. The RI-detector was maintained at 40° C. and a polymethylmethacrylate solution (1 g/l) was used as a standard. The number-average molecular weight (Mn), the weight-average molecular weight (Mw) and the polydispersity index (PDI) of dimethylaminopropyl methacrylamide-butyl methacrylate-methyl methacrylate copolymer were determined (Table 9).

Preparation of an Amorphous Solid Dispersion (ASD) Via Hot-Melt Extrusion

A blend in a stoichiometric ratio of a polymer and a specific drug (Table 3) was prepared by mixing these substances in a glass closed with a screw cap using a Turbular mixer from WAB Group (Nidderau-Heldenbergen, Germany) for approximately 10 min. The polymer-drug blend was processed via hot-melt extrusion technology to receive an amorphous solid dispersion (ASD) using a co-rotating HAAKE MiniLab twin screw extruder from Thermo Fisher Scientific (Dreieich, Germany) that exhibited a conical screw design. The hot-melt extrusion process was characterized by recording the applied screw speed, the torque and the process temperature (Table 3). The continuously generated strand, leaving the extruder at its nozzle, cooled down while it was transported using a conveying belt and was finally chopped into a coarse granule. The granule was ground (mesh size: 0.25 mm) using an Ultra Centrifugal Mill ZM 200 from Retsch GmbH (Haan, Germany). The obtained powder was the dosage form that was used for further studies.

Dissolution Studies of ASD

Dissolution experiments were performed according to USP 42-NF 37 (2019). Dissolution experiments were conducted with 25 mg drug substance or an equivalent amount of ASD using USP apparatus II (DT 800 LH) from ERWEKA GmbH (Heusenstamm, Germany). The paddle speed was set to 100 rpm and all experiments were performed in 500 ml of 0.1N hydrochloric acid. The dissolution tests were conducted over 120 min.

HPLC Method for Analyzing Fenofibrate

The high-performance liquid chromatography (HPLC) system (Agilent 1260 Infinity) was used for the quantification of celecoxib consisted of a quaternary pump (G1311B), autosampler (G1329B), column oven (G1316A) and UV detector (G1314C), all obtained from Agilent Technologies (Frankfurt am Main, Germany). Separation was achieved using a Symmetry 300 C18 (150×4.6 mm, 5 µm) column maintained at 22° C. The mobile phase consisted of an acetonitrile:water mixture (70:30 v/v), adjusted to pH 2.50 with phosphoric acid. The flow rate was set to 2.0 ml/min. An injection volume of 20 µl was applied and fenofibrate was detected at 286 nm. In the concentration range of 0.13-526 µg/ml, the analytical curve was linear ($r^2$=0.999992). The method was found to be accurate (101.2-101.4%) and precise (CV 2.42%) with a quantification limit of 0.05 µg/ml. Run time was defined to be 6 min. Selectivity was determined (formulation excipients) and no interference was observed in drug retention time. Moreover, the peak area did not change in the presence of all excipient used in the study.

Differential Scanning Calorimetry (DSC) Analysis (DIN EN ISO 11357-2:2013)

ASD was thermally analyzed via DSC to determine, if the incorporated drug demonstrated an amorphous (glass transition) or crystalline (melting/crystallization peak) appearance. The glass transition is a reversible transition from a hard and relatively brittle, frozen state to a molten or rather rubbery state within amorphous or partly amorphous materials. The melting point of the pure drug substance as well as the glass transition temperature of the polymer were investigated for identifying changes and/or shifts in the thermograms of ASD regarding crystalline and/or amorphous characteristics. A sample of 5-10 mg each was weighed into a small, perforated aluminum pan with a lid that was cold sealed and exposed to a heating-cooling-heating cycle starting from 0° C. up to 200° C. while running the measurement continuously applying inert nitrogen atmosphere. The constant heating/cooling rate was set to 10° C./min. In the resulting thermogram the heat flow is plotted against the temperature using an endothermic presentation method. The evaluation was based on the second heating cycle, and the indicated value is the mean value in the glass transition interval. The analysis was conducted using a DSC 3+(DSC-HC01) from Mettler Toledo (Gießen, Germany).

Coating of Diprophylline-Pellets

An organic solution/dispersion for the coating of diprophylline-pellets consisting of dimethylaminopropyl methacrylamide-butyl methacrylate-methyl methacrylate copolymer or dimethylaminoethyl methacrylate-butyl methacrylate-methyl methacrylate (EUDRAGIT® E 100), the plasticizer triethyl citrate and the glidant talc (amounts given in table 7) was prepared using a solvent mixture of acetone:isopropanol:water (38.86:58.28:2.86 w/w). The diprophylline-pellets were placed in the coater and the organic solution/dispersion which was atomized at the nozzle outlet is supplied during the process via a peristaltic pump. The coating process was characterized by recording the product bed and exhaust air temperature as well as the relative humidity of the exhaust air (Table 7). Moreover, fixed parameters referring to the coating process concern a spray-nozzle diameter of 0.8 mm, a constant air volume of 20 m³/h, a tube inner diameter of 1.0 mm, a flow rate of 1.4 g/min, a spray pressure of 0.7 bar, a supply air temperature of 25° C. and its relative humidity of 26% as well as a volume of 0.3 l regarding the product container of the fluid bed system. The coating process was conducted using the fluid bed system OYSTAR Hüttlin Mycrolab from Hüttlin GmbH (Schopfheim, Germany) applying bottom-spray technology.

Dissolution Studies of Coated Diprophylline-Pellets

Dissolution experiments were performed according to USP 42-NF 37 (2019). Dissolution experiments were conducted with 15 mg drug substance or an equivalent amount of coated diprophylline-pellets using USP apparatus II (DT 700 B) from ERWEKA GmbH (Heusenstamm, Germany). The paddle speed was set to 100 rpm and all experiments were performed in 250 ml of artificial saliva dissolution medium (pH 6.8) using mini vessels. The composition of the artificial saliva (pH 6.8) is shown in Table 1. The dissolution tests were conducted over 10 min.

TABLE 1

Composition of artificial saliva dissolution medium (pH 6.8) according to Pimparade, M. B., Morott, J. T., Park, J. B., Kulkarni, V. I., Majumdar, S., Murthy, S. N., Lian, Z., Pinto, E., Bi, V., Durig, T., Murthy, R., Shivakumar, H. N., Vanaja, K., Kumar, P. C., Repka, M. A. (2015). *"Development of taste masked caffeine citrate formulations utilizing hot melt extrusion technology and in vitro-in vivo evaluations, International Journal of Pharmaceutics* 487(1-2): 167-176.

| name of compound | amount of compound [g/l] |
|---|---|
| NaCl | 1.017 |
| $K_2CO_3 \times 1.5\ H_2O$ | 0.603 |
| $Na_2HPO_4$ | 0.108 |
| $NaH_2PO_4 \times 2\ H_2O$ | 0.308 |
| $CaCl_2 \times 2\ H_2O$ | 0.228 |
| $MgCl_2 \times 6\ H_2O$ | 0.061 |

The artificial saliva dissolution medium (pH 6.8) was adjusted to pH 6.8 using phosphoric acid before adding calcium chloride and magnesium chloride. The addition of these salts did not change the final pH.

UV/VIS Spectroscopy for Analyzing Diprophylline

Samples of diprophylline were analyzed using UV/VIS spectrometer "Lambda 25" from PerkinElmer LAS GmbH (Rodgau, Germany) at a wavelength of 274 nm in reference to artificial saliva dissolution medium (pH 6.8) as a blank. The calculation was based on a two-point calibration for diprophylline.

Water Vapor Permeability Test (Gravimetric) of Polymeric Films (DIN 53122-1:2001)

For the determination of the water vapor transmission rate (WVTR) by gravimetry applying a water permeability test the preparation of a polymeric film was required first. The polymer was dissolved in a solvent mixture comprising acetone:isopropanol:water (38.86:58.28:2.86 w/w) under vigorous magnetic stirring. To remove remaining undissolved solid particles or small coagulates, the polymer solution of approximately 25% by weight was filtered through a 100 µm mesh sieve and then was left for around 30 min, that allowed air bubbles to escape. A glass plate of 16×14 cm size was covered with condenser aspirate before the filtered polymer solution was pulled over the glass plate with a squeegee. In this way, after evaporation of the solvent over a period of 24 h, polymer films were formed which had a layer thickness of 25 µm±5 µm. From the dried polymeric film, round sample surfaces of 35 mm diameter were punched out for the test cell that is used for the water vapor permeability test. Before use, the test cell was filled with silica gel and pre-dried at 140° C. for 24 hours and then cooled in a desiccator to ensure mass constancy. The polymer film samples were placed between the ground edge (20 mm inner diameter, 36 mm outer diameter) of the upper (20 mm in height) and lower part (48 mm in height) of the test cell and placed in the special glass test desiccator. The test desiccator measured 390 mm in height including the lid and possessed a bottom round surface with a diameter of 340 mm. It was filled to a height of approximately 20 mm with supersaturated potassium chloride solution and was equipped with a perforated porcelain plate (126 holes with a diameter of 4 mm). Furthermore, a moisture analyzer, a thermometer and a stirring motor with blade stirrer for air circulation were installed in the test desiccator. The evaporation chamber in the closed test desiccator exhibited a temperature of 23±2° C. and a relative humidity of 85±3%. The initial weight of the test cell including the polymer film was determined and the test cell was placed in the test desiccator. The first 2 hours of the water vapor permeability test were used to temper and saturate the polymer film. The mass of the test cell determined after 2 hours is used as a blank value for the measured value after 24 h. The calculated water vapor transmission rate (WVTR) by gravimetry is expressed in $g/(m^2 \cdot d)$.

Flowability Measurement

The flowability of the polymers was analyzed using the flowability tester BEP 2 from Copley Scientific (Nottingham, United Kingdom). The mentioned device measured the time that it takes for 100 g of polymer to flow through a 10 mm nozzle and determines the slope angle of the pile. A high flow rate and a low slope angle characterizes a polymer as good flowable. For better comparability, all polymers which were subjected to the flowability test, were previously reduced to a particle size of approximately 250 µm ($d_{50}$) using an Ultra Centrifugal Mill ZM 200 from Retsch GmbH (Haan, Germany).

Particle Size Distribution Analysis

Dimethylaminopropyl methacrylamide-butyl methacrylate-methyl methacrylate copolymer considering different molecular weights ($M_w$) and dimethylaminoethyl methacrylate-butyl methacrylate-methyl methacrylate were subjected to investigation of particle size distribution by laser diffraction technology by using a Mastersizer 3000 from Malvern Panalytical Ltd. (Malvern, United Kingdom). The particles were suspended in Milli Q water and measured as soon as an obscuration range of 5-10% was achieved. The particle size distribution can also be measured according to ISO DIN 13320:2020-01.

Stability Studies

ASDs were stored at constant and controlled conditions (30° C./65% RH) in a climatic chamber from Binder GmbH (Tuttlingen, Germany) over 6 months. The samples were kept in a 30 ml amber glass, closed with a screw cap. After 3 and 6 months, samples were withdrawn and the results regarding appearance, drug release and DSC were compared to the data of the samples at the time of manufacture.

RESULTS AND DISCUSSION

Results

TABLE 2

Flowability data of dimethylaminopropyl methacrylamide-butyl methacrylate-methyl methacrylate copolymer considering different molecular weights ($M_w$) and dimethylaminoethyl methacrylate-butyl methacrylate-methyl methacrylate. Each value designates the mean ± S.D. (n = 3).

|  | E-173 kDa | E-254 kDa | E-281 kDa | E-305 kDa | EUDRAGIT ® E 100* |
|---|---|---|---|---|---|
| polymer [g] | 99.90 ± 0.45 | 99.17 ± 0.54 | 99.35 ± 0.55 | 99.87 ± 0.33 | 99.65 ± 0.41 |
| flow time [s] | 30.51 ± 0.60 | 25.37 ± 0.71 | 24.09 ± 0.40 | 23.11 ± 1.46 | N/D |
| flow rate [g/s] | 3.28 ± 0.06 | 3.91 ± 0.13 | 4.13 ± 0.09 | 4.34 ± 0.29 | N/D |
| slope angel [°] | 34.58 ± 0.43 | 31.33 ± 0.52 | 31.87 ± 0.54 | 32.20 ± 1.00 | N/D |

*particle size of approximately 250 μm ($d_{50}$)

With increasing molecular weight, the flowability of dimethylaminopropyl methacrylamide-butyl methacrylate-methyl methacrylate copolymer improved (Table 2). Dimethylaminoethyl methacrylate-butyl methacrylate-methyl methacrylate (Eudragit® E 100) showed no product flow through the nozzle of the flowability tester which was specified in the method.

Composition & Hot-Melt Extrusion Process Parameters of ASD

TABLE 3

Composition & hot-melt extrusion process parameters of ASD incorporating fenofibrate

| polymer | total drug load [%] | extrusion temperature [° C.] | torque [Ncm] | screw speed [rpm] |
|---|---|---|---|---|
| Soluplus ® | 4.2 | 150 | 95 | 200 |
| Kollidon ® VA 64 | 4.2 | 170 | 65 | 200 |
| Kollidon ® 17 PF | 4.2 | 190 | 65 | 200 |
| AQOAT ® AS-MMP | 4.2 | 175 | 140 | 200 |
| E-173 kDa | 4.2 | 160 | 180 | 200 |
| E-254 kDa | 4.2 | 165 | 180 | 200 |
| E-281 kDa | 4.2 | 160 | 200 | 200 |
| E-305 kDa | 4.2 | 165 | 220 | 200 |
| Affinisol ® HPMC 100 LV | 4.2 | 170 | 120 | 100 |
| EUDRDAGIT ® E PO | 4.2 | 150 | 45 | 200 |

Thermal Characterization of the Pure Polymer & ASD Via DSC Analysis

All samples (Table 4) were analyzed immediately after processing via the mentioned DSC method and showed an amorphous appearance (no crystallization peaks). The $T_g$ of an ASD was usually lower in comparison to the pure polymer.

TABLE 4

Glass transition temperature ($T_g$) of pure polymer & ASD incorporating fenofibrate

| polymer | $T_g$ (polymer) [° C.] | $T_g$ (ASD) [° C.] |
|---|---|---|
| Soluplus ® | 70 | 62 |
| Kollidon ® VA 64 | 107 | 92 |
| Kollidon ® 17 PF | 136 | 90 |
| AQOAT ® AS-MMP | 113 | 101 |
| E-173 kDa | 77 | 74 |
| E-254 kDa | 85 | 77 |
| E-281 kDa | 89 | 76 |

TABLE 4-continued

Glass transition temperature ($T_g$) of pure polymer & ASD incorporating fenofibrate

| polymer | $T_g$ (polymer) [° C.] | $T_g$ (ASD) [° C.] |
|---|---|---|
| E-305 kDa | 91 | 80 |
| Affinisol ® HPMC 100 LV | 103 | 84 |
| EUDRAGIT ® E PO | 42 | 34 |

Dissolution Studies

The highest, final level of drug release for ASD incorporating fenofibrate was achieved by E-173 kDa (FIG. 1). The ASD using E-173 kDa was stable during the entire 120 min of the conducted dissolution test and did not show precipitation of the drug. In comparison to the ASDs using other polymers incorporating fenofibrate, E-173 kDa presented a significantly higher level of drug release (around 30%) after 120 min. An initial burst release of fenofibrate was identified for Soluplus® and EUDRAGIT® E PO followed by precipitation after 5-10 min of testing (FIG. 1).

Stability Studies

Appearance

After 3 months of storage under defined and constant conditions (30° C./65% RH), almost all ASD samples did not show any notable formation of agglomerates and could be refluffed easily. Only EUDRAGIT® E PO could not be refluffed and demonstrated large agglomerates sticking together.

Dissolution Studies (after 3 Months of Storage)

Figure 2:
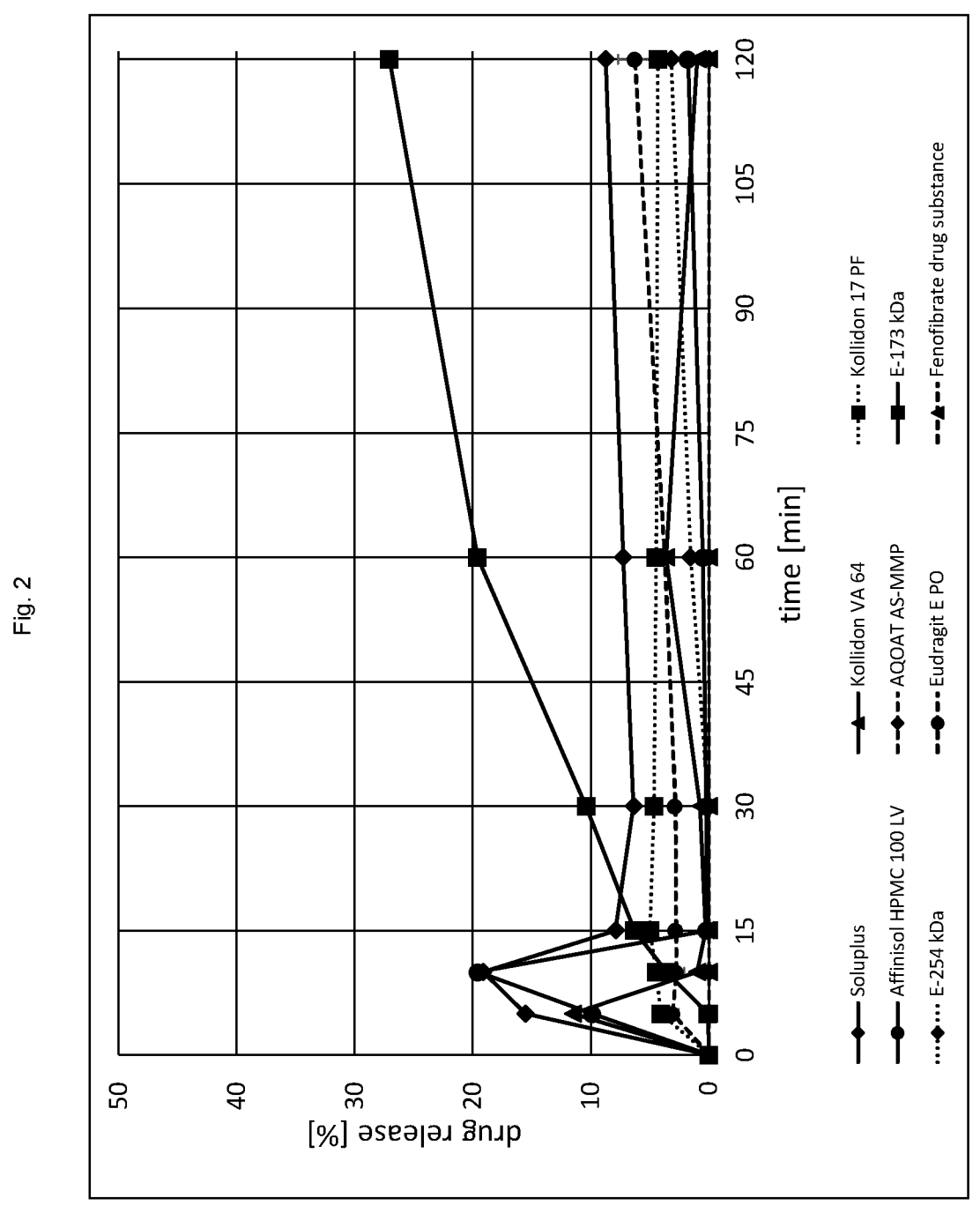

Dissolution tests of ASDs were performed using the mentioned method for the drug substance fenofibrate and the percentages of drug releases after 120 min were determined (FIG. 2). In comparison to the samples at the time of manufacture depending on the polymer, varying decreases of drug release could be detected (Table 5). No reduction in the release of the drug substance fenofibrate was observed for the majority of polymers. However, the relative loss of drug release was very high for Kollidon® VA 64 and AQOAT® AS-MMP. In comparison to the dimethylaminopropyl methacrylamide-butyl methacrylate-methyl methacrylate copolymers (E-173 kDa and E-254 kDa), Eudragit E PO demonstrated a higher relative loss of drug release after 3 months of storage.

TABLE 5

Comparison of drug release regarding ASD at the time of manufacture and after 3 months of storage incorporating the drug substance fenofibrate

| polymer | drug release ASD [%] | drug release ASD (after 3 months) [%] | absolute loss of drug release (ASD) [%] | relative loss of drug release (ASD) [%] |
|---|---|---|---|---|
| Soluplus ® | 7.0 | 8.8 | 0 | 0 |
| Kollidon ® VA 64 | 6.8 | 1.0 | 5.8 | 85.3 |
| Kollidon ® 17 PF | 3.7 | 4.3 | 0 | 0 |
| AQOAT ® AS-MMP | 0.3 | 0 | 0.3 | 100.0 |
| E-173 kDa | 28.3 | 27.1 | 1.2 | 4.2 |
| E-254 kDa | 2.3 | 3.2 | 0 | 0 |
| Affinisol ® HPMC 100 LV | 0.2 | 1.8 | 0 | 0 |
| EUDRAGIT ® E PO | 7.0 | 6.3 | 0.7 | 10.0 |

Water Vapor Permeability Test

TABLE 6

Water vapor transmission rate (WVTR) of dimethylaminopropyl methacrylamide-butyl methacrylate-methyl methacrylate copolymer considering different molecular weights ($M_w$) and dimethylaminoethyl methacrylate-butyl methacrylate-methyl methacrylate. Each value designates the mean ± S.D. (n = 2).

| polymer | temperature [° C.] at t = 0 h | rel. humidity [%] at t = 0 h | temperature [° C.] at t = 24 h | rel. humidity [%] at t = 24 h | water vapor transmission rate (WVTR) [g/(m²*d)] ± S.D. |
|---|---|---|---|---|---|
| E-173 kDa | 23.6 | 83.5 | 23.9 | 82.6 | 318.8 ± 2.8 |
| E-254 kDa | 23.6 | 83.5 | 23.9 | 82.6 | 303.4 ± 7.5 |
| E-305 kDa | 23.6 | 83.5 | 23.9 | 82.6 | 319.5 ± 5.3 |
| EUDRAGIT ® E 100 | 23.6 | 83.5 | 23.9 | 82.6 | 319.9 ± 3.1 |

The dimethylaminopropyl methacrylamide-butyl methacrylate-methyl methacrylate copolymer, especially the E-254 kDa, demonstrated a lower water vapor transmission rate (WVTR) in comparison to dimethylaminoethyl methacrylate-butyl methacrylate-methyl methacrylate (EUDRAGIT® E 100) under the same test conditions (Table 6). The data of the water vapor permeability test may lead to the fact that the dimethylaminopropyl methacrylamide-butyl methacrylate-methyl methacrylate copolymer exhibits a similar potential for moisture protection as dimethylaminoethyl methacrylate-butyl methacrylate-methyl methacrylate.

Resistance of Polymer Coating to Drug Release in Artificial Saliva Dissolution Medium (pH 6.8)

TABLE 7

Composition of the coating solution/dispersion, process parameters and characteristics of the coated diprophylline-pellets

| polymer | amount of coating compounds (polymer/triethyl citrate/talc) [g] | amount of solvent mixture for coating [g] | amount of diprophylline-pellets* [g] | temperature of product bed [° C.] | temperature of exhaust air [° C.] | Relative humidity of exhaust air [%] | application quantity of polymer after coating [%] | drug content after coating [%] |
|---|---|---|---|---|---|---|---|---|
| E-173 kDa | 20/10/4 | 306 | 100.0 | 23.4 | 22.5 | 18.3 | 14.5 | 40.1 |
| E-305 kDa | 20/10/4 | 306 | 100.0 | 23.6 | 22.6 | 20.4 | 15.2 | 38.9 |
| EUDRAGIT ® E 100 | 20/10/4 | 306 | 100.0 | 23.6 | 22.7 | 16.9 | 15.6 | 38.1 |

*content of diprophylline = 53.7%

Diprophylline-pellets coated with the polymer E-305 kDa showed the lowest release of diprophylline (1.5%) during 10 min in artificial saliva medium. A coating with EUDRAGIT® E 100 revealed a diprophylline release of about 5% in 10 min and exhibited a higher application quantity of polymer after the coating process in comparison to E-305 kDa and E-173 kDa respectively. For this experiment, a higher quantity of polymer for the coating leads to a stronger delay of drug release. Taking E-173 kDa with a diprophylline release of about 35% in 10 min into account, there was reason to assume that the molecular weight of the polymer remarkably impacted the resistance of polymer coating. A very low drug release in artificial saliva dissolution medium (pH 6.8) may lead to good taste-masking qualities.

Residual Monomer (ReMo) Analysis & Monomer Conversion Rate

Based on the results (average of Table 8) of the residual monomer analysis (6.16% by weight for dimethylaminopropyl methacrylamide, 0.002% by weight for butyl methacrylate and 0.035% by weight for methyl methacrylate) considering a monomer ratio of 2:1:1 (dimethylaminopropyl methacrylamide:butyl methacrylate:methyl methacrylate), the average monomer conversion rate was calculated at 87.68% for dimethylaminopropyl methacrylamide, 99.99% for butyl methacrylate and 99.86% for methyl methacrylate. That leads to a final polymer composition of 46.74% by weight for dimethylaminopropyl methacrylamide, 26.65% by weight for butyl methacrylate and 26.61% by weight for methyl methacrylate.

TABLE 8

Residual monomer content, monomer conversion rate and the final polymer composition of dimethylaminopropyl methacrylamide-butyl methacrylate-methyl methacrylate copolymer

| polymer | residual monomers (ReMo) | | | monomer conversion rate | | | final polymer composition | | |
|---|---|---|---|---|---|---|---|---|---|
| | DMAPMA* [%] | BMA* [%] | MMA* [%] | DMAPMA* [%] | BMA* [%] | MMA* [%] | DMAPMA* [%] | BMA* [%] | MMA* [%] |
| E-173 kDa | 6.48 | 0.002 | 0.022 | 87.04 | 99.99 | 99.91 | 46.55 | 26.74 | 26.71 |
| E-254 kDa | 6.79 | 0.002 | 0.037 | 86.42 | 99.99 | 99.85 | 46.38 | 26.83 | 26.79 |
| E-281 kDa | 5.59 | 0.002 | 0.034 | 88.82 | 99.99 | 99.86 | 47.06 | 26.49 | 26.45 |
| E-305 kDa | 5.78 | 0.002 | 0.045 | 88.44 | 99.99 | 99.82 | 46.96 | 26.54 | 26.50 |
| average | 6.16 | 0.002 | 0.035 | 87.68 | 99.99 | 99.86 | 46.74 | 26.65 | 26.61 |

* DMAPMA = dimethylaminopropyl methacrylamide, BMA = butyl methacrylate, MMA = methyl methacrylate Gel Permeation Chromatography (GPC)

Running the described GPC-method, the number-average molecular weight (Mn), the weight-average molecular weight (Mw) and the polydispersity index (PDI) were determined for the dimethylaminopropyl methacrylamide-butyl methacrylate-methyl methacrylate copolymer that was synthesized using four different concentrations of the chain-transfer-agent n-dodecyl mercaptan. The results are shown in Table 9.

TABLE 9

$M_n$, $M_w$ and PDI regarding dimethylaminopropyl methacrylamide-butyl methacrylate-methyl methacrylate copolymer via GPC analysis

| concentration of n-dodecyl mercaptan [%] | number-average molecular weight ($M_n$) [kDa] | weight-average molecular weight ($M_w$) [kDa] | polydispersity index (PDI) |
|---|---|---|---|
| 1.5 | 41.5 | 173 | 4.17 |
| 0.9 | 64.1 | 254 | 3.97 |
| 0.5 | 71.7 | 281 | 3.92 |
| 0.3 | 81.4 | 305 | 3.75 |

Examples 5 to 8

Further novel methacrylic copolymers were prepared similar to the method as disclosed above for examples 1 to 4. Examples 5 to 8 were manufactured using the same monomers, chemical reaction conditions, chain-transfer-agent (CTA) and radical initiators as well as set up for the polymerization as mentioned for examples 1 to 4. Different from examples 1 to 4, the examples 5 to 8 were synthesized using isopropanol instead of n-propanol. Applying isopropanol as a solvent may generally lead to lower $M_w$ in comparison to trials using n-propanol. In addition, for example 8 a diluted peroxyneodecanoate (0.3% in isopropanol) solution has been applied by using a higher flow rate of about 9.3 g/min and a variation of the monomer ratio was tested (dimethylaminopropyl methacrylamide:butyl methacrylate:methyl methacrylate 4:1:3 by weight). Examples 5 to 7 exhibited the same monomer ratio as examples 1 to 4. For example 5, a lower amount of CTA was applied leading to a higher $M_w$ in comparison to example 6 and 7.

| polymer | CTA content | $M_n$ [g/mol] | $M_w$ [g/mol] | PDI | $T_g$ [° C.] | DMAPMA content [%] |
|---|---|---|---|---|---|---|
| Ex. 5 | 0.7% | 35 700 | 159 000 | 4.5 | 75 | 48.39 |
| Ex. 6 | 1.2% | 23 700 | 87 900 | 3.7 | 81 | 48.42 |
| Ex. 7 | 1.2% | 18 500 | 52 900 | 2.9 | 78 | 48.31 |
| Ex. 8 | 1.2% | 33 600 | 111 000 | 3.3 | 95 | 47.12 |

The invention claimed is:

1. A methacrylic copolymer, consisting of:
   units derived from at least one alkyl methacrylate; and
   units derived from methacrylamide,
   wherein the units derived from methacrylamide are present in at least 34 wt. %, based on a total weight of the methacrylic copolymer.

2. A methacrylic copolymer according to claim 1, wherein the methacrylic copolymer has:
   i) a weight average molecular weight Mw of from 15,000 to 500,000 g/mol; and/or
   ii) a number average molecular weight Mn of from 10,000 to 150,000 g/mol; and/or
   iii) a polydispersity of from 2.0 to 10.0; and/or
   iv) a glass transition temperature Tg of from 60 to 100° C.

3. A methacrylic copolymer according to claim 1, wherein the methacrylic copolymer is a dimethylaminopropyl methacrylamide-butyl methacrylate-methyl methacrylate copolymer.

4. A method of preparing the methacrylic copolymer according to claim 1, the method comprising:
   performing a free radical polymerization of a monomer mixture consisting of:
     40 to 60 wt. % of a methacrylamide, alkyl methacrylamide or aminoalkyl methacrylamide; and
     40 to 60 wt. % of at least one alkyl methacrylate,
     wherein a sum of monomers is 100 wt. %,
   in the presence of
   at least one initiator;
   at least one chain-transfer agent; and
   optionally, in the presence of at least one solvent.

5. A pharmaceutical composition, comprising:
   at least one said methacrylic copolymer according to claim 1, and
   at least one pharmaceutically active ingredient.

6. A nutraceutical composition, comprising:
   at least one said methacrylic copolymer according to claim 1, and
   at least one nutraceutically active ingredient.

7. A coated pharmaceutical or nutraceutical dosage form, wherein a coating comprises at least one said methacrylic copolymer according to claim 1.

8. A nano- or microparticle comprising at least one said methacrylic copolymer according to claim 1.

9. A method of coating, comprising:
   coating an object with at least one said methacrylic copolymer according to claim 1.

10. A method comprising:
    carrying an active pharmaceutical ingredient with at least one said methacrylic copolymer according to claim 1.

11. A method of dispersing, comprising:
    preparing an amorphous solid dispersion with at least one said methacrylic copolymer according to claim 1 as a matrix.

12. A pharmaceutical composition according to claim 5, wherein the methacrylic copolymer is a dimethylaminopropyl methacrylamide-butyl methacrylate-methyl methacrylate copolymer.

13. A nutraceutical composition according to claim 6, wherein the methacrylic copolymer is a dimethylaminopropyl methacrylamide-butyl methacrylate-methyl methacrylate copolymer.

14. A methacrylic copolymer according to claim 1 wherein said units derived from methacrylamide are derived from dimethylaminopropyl methacrylamide.

15. A method according to claim 4 wherein said copolymer is dimethylaminopropyl methacrylamide-butyl methacrylate-methyl methacrylate copolymer and said monomer mixture that is polymerized consists of 40 to 60 wt. % of dimethylaminopropyl methacrylamide, 15 to 35 wt. % of butyl methacrylate and 15 to 35 wt. % of methyl methacrylate.

16. A pharmaceutical formulation including the pharmaceutical composition according to claim 5 in a form of at least one of tablets, orodispersible tablets, pills, pellets, capsules, dragees and granules.

17. A nutraceutical formulation including the nutraceutical composition according to claim 6 in a form of at least one of tablets, pills, pellets and capsules.

* * * * *